United States Patent
Feiste et al.

(10) Patent No.: US 7,953,960 B2
(45) Date of Patent: May 31, 2011

(54) METHOD AND APPARATUS FOR DELAYING A LOAD MISS FLUSH UNTIL ISSUING THE DEPENDENT INSTRUCTION

(75) Inventors: Kurt Alan Feiste, Austin, TX (US); David Scott Ray, Georgetown, TX (US); David Shippy, Austin, TX (US); Albert James Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 11/252,410

(22) Filed: Oct. 18, 2005

(65) Prior Publication Data

US 2007/0088935 A1    Apr. 19, 2007

(51) Int. Cl.
*G06F 9/30* (2006.01)

(52) U.S. Cl. ........................................ 712/216
(58) Field of Classification Search .............. None
See application file for complete search history.

(56) References Cited

U.S. PATENT DOCUMENTS

| | | | |
|---|---|---|---|
| 5,761,474 A * | 6/1998 | Lesartre et al. | 712/217 |
| 5,784,603 A * | 7/1998 | Leung et al. | 712/234 |
| 6,065,105 A * | 5/2000 | Zaidi et al. | 712/23 |
| 6,212,623 B1 * | 4/2001 | Witt | 712/216 |
| 6,553,482 B1 * | 4/2003 | Witt | 712/216 |
| 6,754,808 B1 * | 6/2004 | Roth et al. | 712/218 |
| 7,594,096 B2 * | 9/2009 | Eickemeyer et al. | 712/207 |
| 7,711,929 B2 * | 5/2010 | Burky et al. | 712/217 |
| 2002/0138714 A1 * | 9/2002 | Leibholz et al. | 712/217 |
| 2002/0144176 A1 * | 10/2002 | Smith | 714/11 |
| 2003/0061445 A1 * | 3/2003 | Birk et al. | 711/118 |
| 2003/0061467 A1 * | 3/2003 | Yeh et al. | 712/217 |
| 2006/0168393 A1 * | 7/2006 | Christensen et al. | 711/109 |
| 2006/0288195 A1 * | 12/2006 | Ma et al. | 712/226 |

OTHER PUBLICATIONS

Ronen et al., "Coming Challenges in Microarchitecture and Architecture", Proceedings of the IEEE, vol. 89, No. 3, Mar. 2001, pp. 325-328.

* cited by examiner

*Primary Examiner* — Eddie P Chan
*Assistant Examiner* — Keith Vicary
(74) *Attorney, Agent, or Firm* — Stephen J. Walder, Jr.; Matthew B. Talpis

(57) ABSTRACT

A pipeline processor has circuits to detect the presence of a register access instruction in an issue stage of the pipeline. A load-miss occurring at a later stage may cause the register access instruction to be marked with an associated bit. The register access instruction progresses down the pipeline and when the flush stage is reached, the processor checks the associated bit and flushes the register access instruction.

21 Claims, 8 Drawing Sheets

FIG. 4A

| PIPESTAGE | INSTRUCTION | IS2 | IS3 | RF1 | RF2 | EX1 | EX2 | EX3 | EX4 | EX5 | EX6 | EX7 | FL |
|---|---|---|---|---|---|---|---|---|---|---|---|---|---|
| IS1 | ADD RZ, R1, R3 | 0 | 0 | 0 | 0 | 0 | 0 | 0 | 1 | 0 | 0 | 0 | 1 |
| IS2 | VMX | | 0 | 0 | 0 | 0 | 0 | 0 | 0 | 0 | 0 | 0 | 0 |
| IS3 | ADD RY, R3 | | | 0 | 0 | 0 | 0 | 0 | 1 | 0 | 0 | 0 | 0 |
| RF1 | ADD RX, R2 | | | | | 0 | 0 | 0 | 0 | 0 | 1 | 0 | 0 |
| RF2 | LOAD R4, R2 | | | | | 0 | 0 | 0 | 0 | 0 | 0 | 0 | 0 |
| EX1 | | | | | | | | | | 0 | 0 | 0 | 0 |
| EX2 | | | | | | | | | | | 0 | 0 | 0 |
| EX3 | | | | | | | | | | | | 0 | 0 |
| EX4 | LOAD R3 | | | | | | | | | | | | 0 |
| EX5 | | | | | | | | | | | | | |
| EX6 | LOAD R2 | | | | | | | | | | | | |
| EX7 | | | | | | | | | | | | | |

FIG. 4B

| MISS QUEUE ENTRY | REGISTER | ORIGINAL INSTRUCTION |
|---|---|---|
| 1 | R1 | LOAD R1 |
| 2 | | |
| 3 | | |
| 4 | | |

FIG. 5A

| PIPESTAGE | INSTRUCTION | IS2 | IS3 | RF1 | RF2 | EX1 | EX2 | EX3 | EX4 | EX5 | EX6 | EX7 | FL |
|---|---|---|---|---|---|---|---|---|---|---|---|---|---|
| IS1 |  | 0 |  |  |  |  |  |  |  |  |  |  | 0 |
| IS2 | ADD RZ, R1, R3 |  | 0 | 0 | 0 | 0 | 0 | 0 | 0 | 0 | 0 | 0 | 1 |
| IS3 | VMX |  |  | 0 | 0 | 0 | 0 | 0 | 0 | 0 | 1 | 0 | 0 |
| RF1 |  |  |  |  | 0 | 0 | 0 | 0 | 0 | 0 | 0 | 0 | 0 |
| RF2 | ADD RY, R3 |  |  |  |  | 0 | 0 | 0 | 0 | 0 | 0 | 0 | 0 |
| EX1 | ADD RX, R2 |  |  |  |  |  | 0 | 0 | 0 | 0 | 1 | 0 | 0 |
| EX2 | LOAD R4, R2 |  |  |  |  |  |  | 0 | 0 | 0 | 0 | 0 | 0 |
| EX3 |  |  |  |  |  |  |  |  |  |  | 0 | 0 | 0 |
| EX4 |  |  |  |  |  |  |  |  |  |  |  |  | 0 |
| EX5 |  |  |  |  |  |  |  |  |  |  |  |  |  |
| EX6 | LOAD R3 |  |  |  |  |  |  |  |  |  |  |  |  |
| EX7 |  |  |  |  |  |  |  |  |  |  |  |  |  |

FIG. 5B

| MISS QUEUE ENTRY | REGISTER | ORIGINAL INSTRUCTION |
|---|---|---|
| 1 | R1 | LOAD R1 |
| 2 |  |  |
| 3 |  |  |
| 4 |  |  |

FIG. 6A

| PIPESTAGE | INSTRUCTION | IS2 | IS3 | RF1 | RF2 | EX1 | EX2 | EX3 | EX4 | EX5 | EX6 | EX7 | FL |
|---|---|---|---|---|---|---|---|---|---|---|---|---|---|
| IS1 | | 0 | 0 | 0 | 0 | 0 | 0 | 0 | 0 | 0 | 0 | 0 | 0 |
| IS2 | ADD RZ, R1, R3 | | 0 | 0 | 0 | 0 | 0 | 0 | 0 | 0 | 0 | 0 | 1 |
| IS3 | VMX | | | 0 | 0 | 0 | 0 | 0 | 0 | 0 | 0 | 0 | 0 |
| RF1 | | | | | 0 | 0 | 0 | 0 | 0 | 0 | 0 | 0 | 0 |
| RF2 | | | | | | 0 | 0 | 0 | 0 | 0 | 0 | 0 | 0 |
| EX1 | | | | | | | 0 | 0 | 0 | 0 | 0 | 0 | 0 |
| EX2 | ADD RY, R3 | | | | | | | 0 | 0 | 0 | 0 | 0 | 1 |
| EX3 | ADD RX, R2 | | | | | | | | 0 | 0 | 0 | 0 | 0 |
| EX4 | LOAD R4, R2 | | | | | | | | | 0 | 0 | 0 | 0 |
| EX5 | | | | | | | | | | | 0 | 0 | 0 |
| EX6 | | | | | | | | | | | | | |
| EX7 | | | | | | | | | | | | | |

631 (FL column header area), 643 (FL row for EX2)

FIG. 6B

| MISS QUEUE ENTRY | REGISTER | ORIGINAL INSTRUCTION |
|---|---|---|
| 1 | R1 | LOAD R1 |
| 2 | R3 | LOAD R3 |
| 3 | | |
| 4 | | |

683

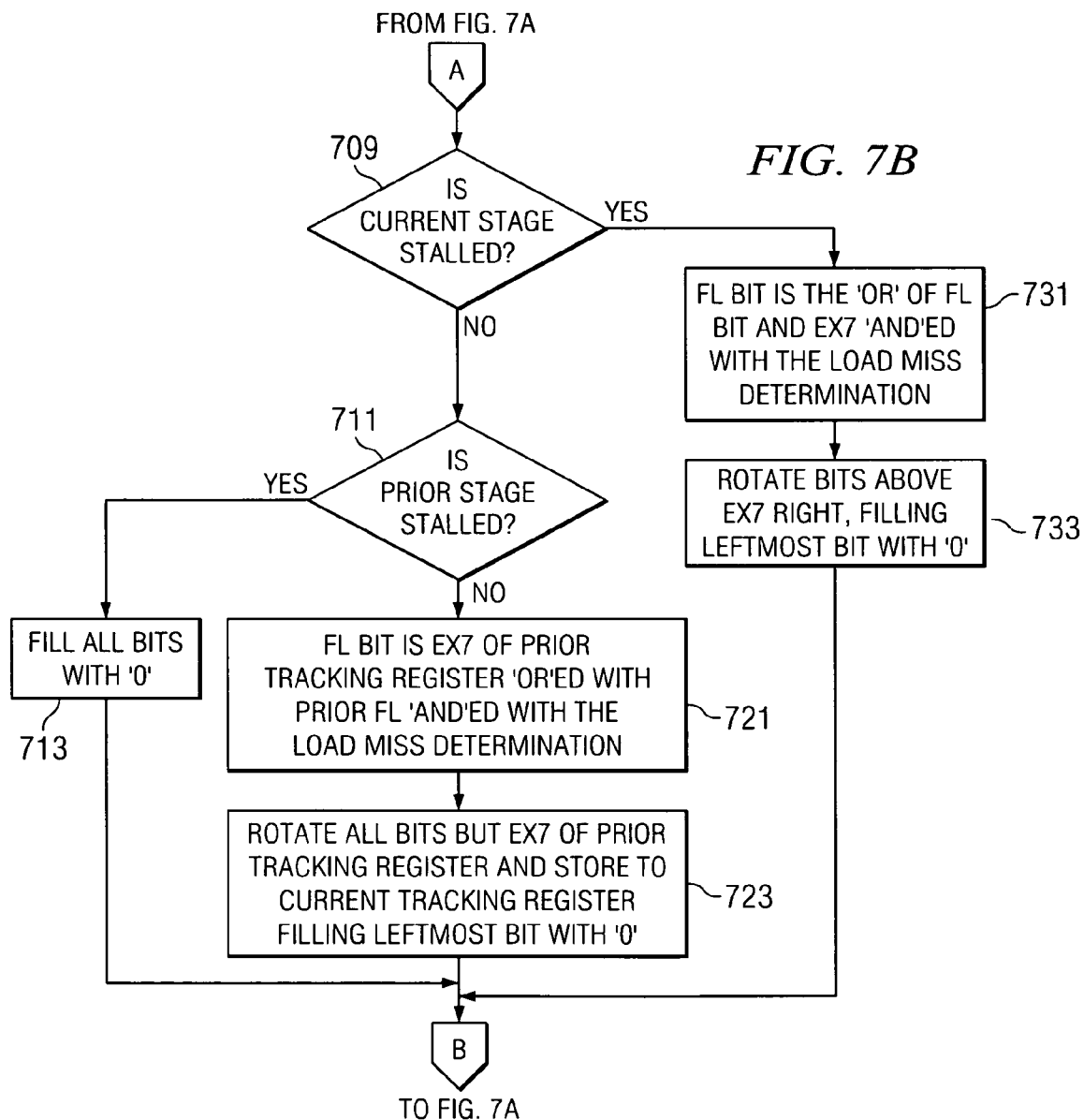

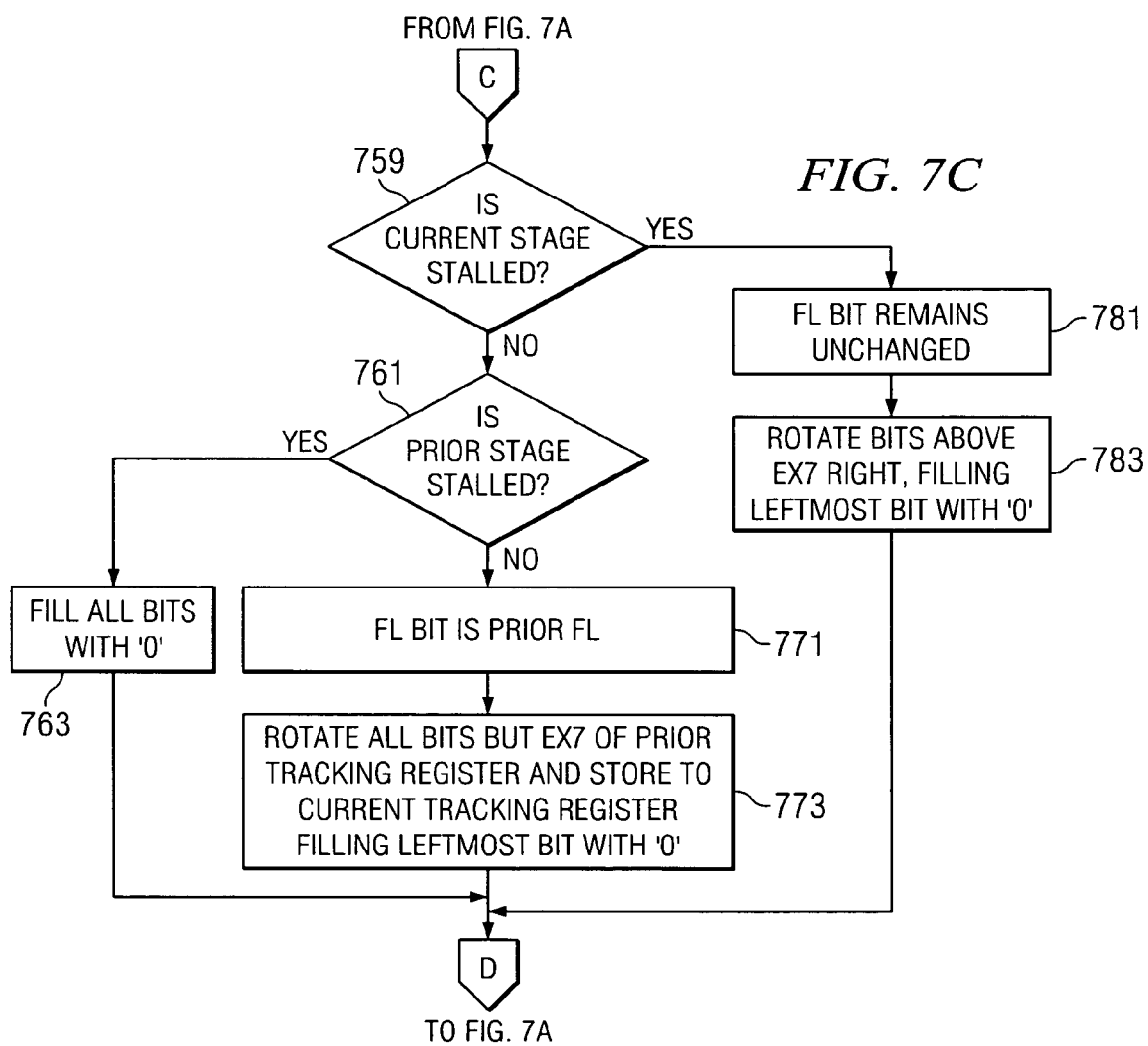

METHOD AND APPARATUS FOR DELAYING A LOAD MISS FLUSH UNTIL ISSUING THE DEPENDENT INSTRUCTION

BACKGROUND OF THE INVENTION

1. Field of the Invention

The present invention generally relates to pipeline processor architecture, and more specifically to delaying a load miss flush and the attendant re-fetching and re-execution.

2. Description of the Related Art

Microprocessor developers have for decades relied on a blend of increasing transistor density and improved architectural efficiency to obtain ever higher throughputs for modern microprocessors. Among the architectures that have been useful is the pipeline architecture, where discrete functional units perform allocated tasks generally in sequence.

One technique that generally improves pipelined processor performance is speculatively assuming that an access to memory, or load, occurs by successfully retrieving the data from a responsive cache. Thus, most of the time, an instruction is prepared for executing just as the memory delivers the data or operand. Unfortunately, occasionally the targeted data does not reside in the cache, and the memory unit issues to the pipeline processor a "load miss" signal.

Microprocessor designers have employed several techniques, or backing mechanisms, to handle the situation when the assumption fails. One such backing mechanism is to restart after the load instruction, which did not finish on time. When both a level one and a level two cache miss occurs, it may take over 100 processor cycles to wait for a load instruction to complete by retrieving data from off-chip.

Another backing mechanism provides expensive instruction flush tagging mechanisms to restart the dependent instruction. The tagging mechanisms tend to occupy a lot of area on a microprocessor die.

SUMMARY OF THE INVENTION

The present invention provides a method and apparatus to flush a register access instruction from a pipeline. A pipeline processor has circuits to detect the presence of a register access instruction in an issue stage of the pipeline. The processor detects a load instruction of the same register in a subsequent stage. Upon detecting both types of instructions for the same register, the processor marks a bit associated with the issue stage and the subsequent stage in a tracking register. The processor may iteratively move instructions from one stage to another stage in the pipeline. The processor propagates the register access instruction to another stage. Then, the processor propagates the bit to another stage. Then, the processor propagates the register access to a flush stage. Then a final propagation moves the bit to the flush stage. The processor flushes the register access instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4A is the progress of instructions through the pipeline stages at an arbitrary time in accordance with an illustrative embodiment of the present invention;

FIG. 4B shows a miss queue of instructions that have left the EX7 stage when a load miss occurs in accordance with an illustrative embodiment of the present invention;

FIG. 5A is the progress of instructions through the pipeline stages at an arbitrary time in accordance with an illustrative embodiment of the present invention;

FIG. 5B shows a miss queue of instructions that have left the EX7 stage when a load hit occurs in accordance with an illustrative embodiment of the present invention;

FIG. 6A is the progress of instructions through the pipeline stages at an arbitrary time in accordance with an illustrative embodiment of the present invention;

FIG. 6B shows a miss queue of instructions that have left the tracking register least significant bit stage when a load miss occurs in accordance with an illustrative embodiment of the present invention;

FIG. 7B is a flow chart of steps in accordance with a further illustrative embodiment of the present invention and FIG. 7C is a flow chart of steps in accordance with a further illustrative embodiment of the present invention.

DETAILED DESCRIPTION OF THE PREFERRED EMBODIMENT

Figure 1:
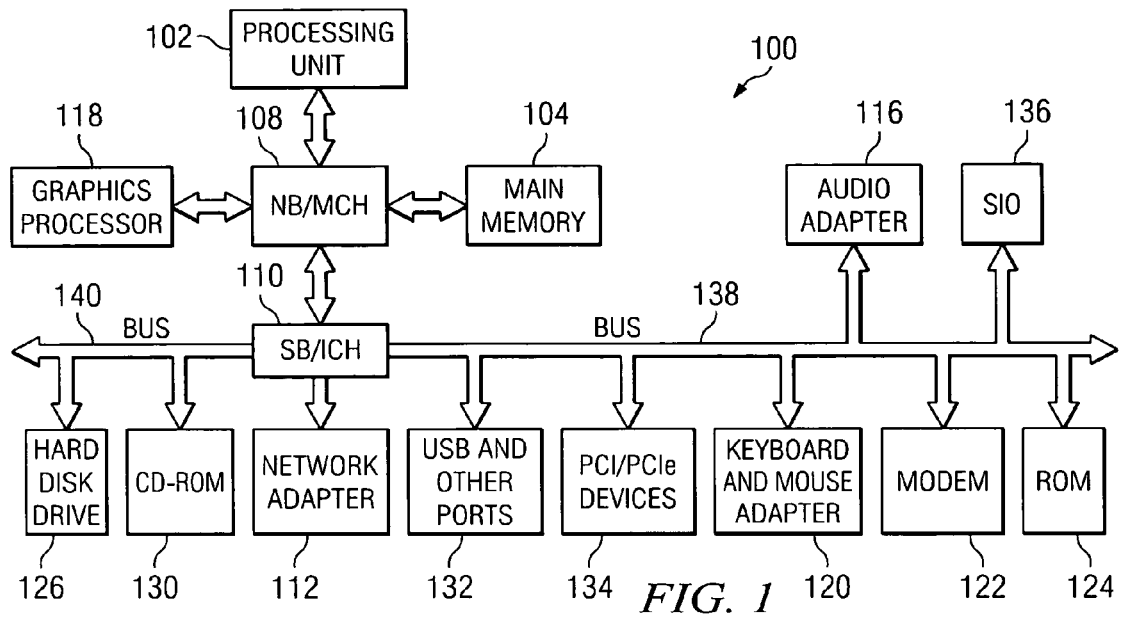
FIG. 1 is a generic information handling system in accordance with an illustrative embodiment of the present invention.

With reference now to FIG. 1, a block diagram of a information handling system is shown in which embodiments of the present invention may be implemented. In the depicted example, information handling system 100 employs a hub architecture including north bridge and memory controller hub (MCH) 108 and south bridge and input/output (I/O) controller hub (ICH) 110. Processing unit 102, main memory 104, and graphics processor 118 connect to north bridge and memory controller hub 108. Graphics processor 118 may connect to north bridge and memory controller hub 108 through an accelerated graphics port (AGP).

In the depicted example, local area network (LAN) adapter 112, audio adapter 116, keyboard and mouse adapter 120, modem 122, read only memory (ROM) 124, universal serial bus (USB) ports and other communications ports 132, and PCI/PCIe devices 134 connect to south bridge and I/O controller hub 110 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 110 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 110.

An operating system runs on processor 102 and coordinates and controls various components within information handling system 100 in FIG. 1. The operating system may be a commercially available operating system such as Windows XP, which is available from Microsoft™ Corporation. While FIG. 1 shows one information handling system that employs processing unit 102, the information handling system may take many forms. For example, information handling system 100 may take the form of a desktop server, portable laptop, or other form-factor computer or data processing system. It may also take other form factors, such as personal digital assistants (PDAs), a gaming device, a portable telephone device, a communication device, or other devices that include a processor and memory.

A processor, such as processor 102 may be operated to have an associated pipeline processor in an illustrative embodiment of the present invention, and the processor may be operated in an information handling system to permit instructions to reach well into the processor pipeline before triggering a flush. In the process, an illustrative embodiment may dispense with the use of flush comparators at many stages as had been used in the prior art. In addition, an illustrative embodiment may be able to process instructions after a load miss but prior to completing any instructions that are dependent on load data.

Figure 2A:
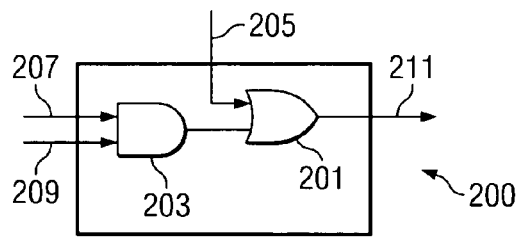
FIG. 2A is a detailed illustration of logic in accordance with an illustrative embodiment of the present invention.
Figure 2B:
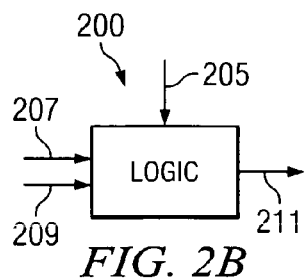
FIG. 2B is a simplified illustration of logic in accordance with an illustrative embodiment of the present invention.

FIG. 2A shows the details of a portion of the logic that may operate within an illustrative embodiment of the present invention. Logic 200 may receive three inputs: flush bit input 205; load miss signal input 207; and tracking register least significant bit input 209. Flush bit input 205 may arrive from a prior stage flush latch. Tracking register least significant bit is also known as the EX7 bit because the bit is associated with an EX7 stage. Load miss signal input 207 and tracking register least significant bit input 209 feeds logical AND gate 203, which provides an output that is also the input to logical OR gate 201. The AND gate output is an intermediate result of logic 200. Logical OR gate 201 takes a second input from flush bit input 205 and provides result logic 211 to circuits outside of logic 200. FIG. 2B shows a simplified version of logic 200. In this example, logic result 211 is diagrammatically depicted with an arrowhead that points away from logic 200. Load miss signal input 207 and tracking register least significant bit input 209 are shown entering a short side of the simplified logic diagram.

Figure 3:
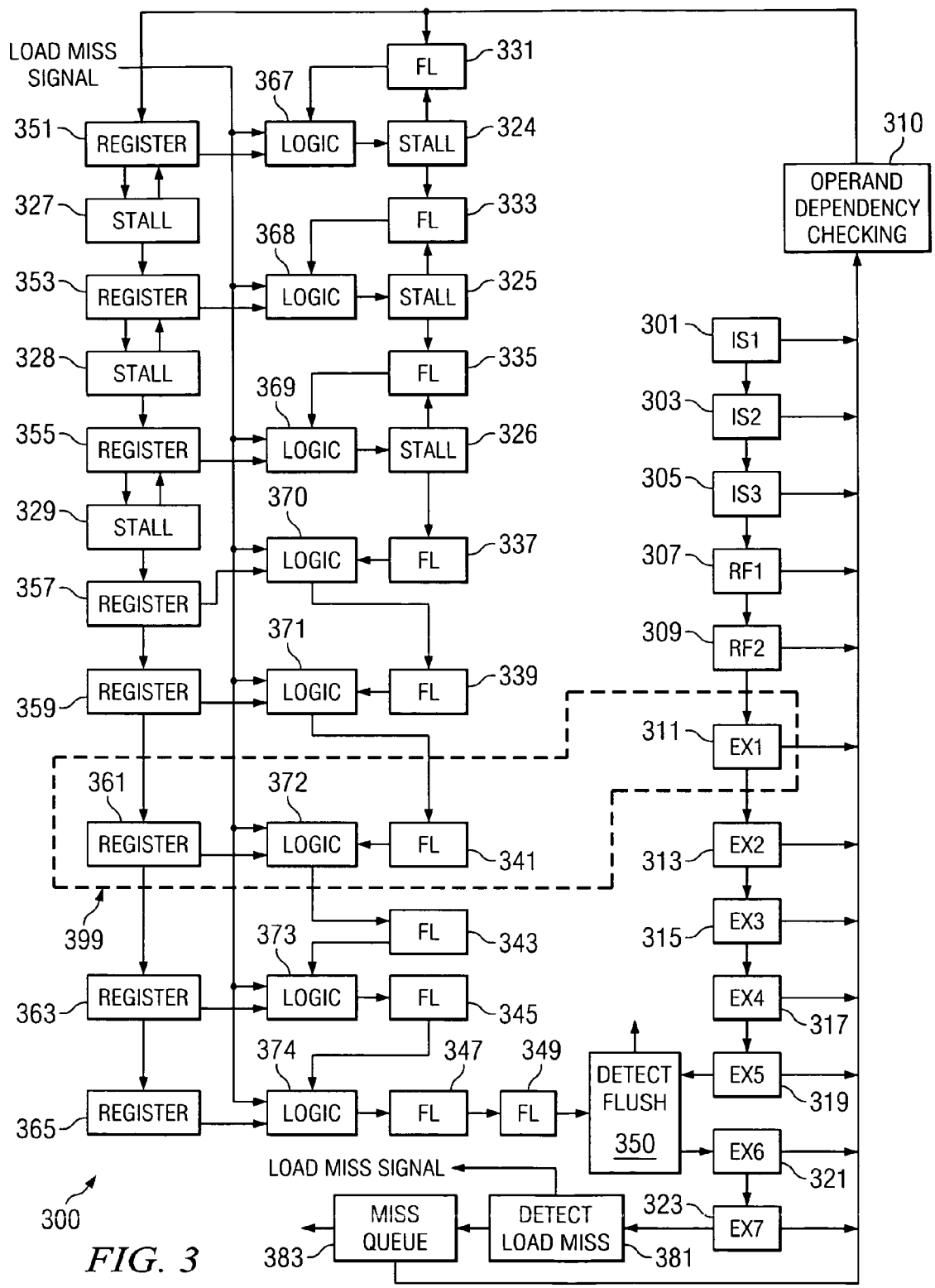
FIG. 3 shows the chief pipeline stages in accordance with an illustrative embodiment of the present invention.

FIG. 3 shows the chief pipeline stages in accordance with an illustrative embodiment of the present invention. Exemplary stage 399 may include a functional unit stage, for example, execution unit stage EX1 311, which may permit processing and have a latch or other storage sufficient to hold intermediate execution results. In addition, exemplary stage 399 may include corresponding flush latch 341, an associated tracking register of one or more associated bits 361 and logic 372 that governs the manner in which flush latch 341 may propagate a stored bit to a subsequent stage. A logic in a prior stage 371, in relation to exemplary stage 399, may logical OR a prior stage flush latch 339 to form a logic result placed in flush latch 341. Prior stage flush latch 339 or prior flush latch is prior only in relation to exemplary stage 399. Other stages may have other latches that comprise prior stage flush latches in relation to those other stages.

Conversely, a flush latch in a subsequent stage 343, in relation to exemplary stage 399, may receive an output bit from logic 372. Thus, a subsequent stage is the stage that receives data from a tracking register of the current stage. Furthermore, flush latch 339 is a prior flush latch in relation to exemplary stage 399. In addition, flush latch 343 is a subsequent flush latch in relation to exemplary stage 399.

A clock signal is distributed among devices of FIG. 3. A clock rising edge may synchronize a propagation of data and instructions from one stage to a next stage. Thus, a clock may cause instructions in functional units to propagate in near unison with propagation of associated bits in tracking registers. Propagation generally occurs in two ways. First, a clock triggers instruction and associated bits to advance from a current stage to a subsequent stage, wherein the associated bits may map to a register of a subsequent stage. Associated bits may be stored in a tracking register and flush latch. The process of mapping may include synchronously transferring all bits but the least significant of the register bits to a tracking register in a subsequent stage. A logic specially handles the least significant bit. The logic may be, for example, logic 200 of FIG. 2. Second, a clock triggers an instruction and associated bits to be processed in place by stalling, wherein the instruction remains in the functional unit of the stage, and the associated bits are mapped to the tracking register of the current stage. In the former case, the instruction and the bits are said to be unstalled; while in the second case, the instruction and the bits are said to be stalled.

Microprocessor 300 may be, for example, processor 102 of information handling system 100 of FIG. 1. In theses examples, microprocessor 300 contains issue unit pipeline stages, such as issue unit pipeline stage IS1 301, issue unit pipeline stage IS2 303, and issue unit pipeline stage IS3 305. Microprocessor 300 includes register fetch pipeline stages, such as register fetch pipeline stage RF1 307, and register fetch pipeline stage RF2 309. In this illustrative example, microprocessor 300 has execution unit pipeline stages such as execution unit pipeline stage EX1 311, execution unit pipeline stage EX2 313, execution unit pipeline stage EX3 315, execution unit pipeline stage EX4 317, execution unit pipeline stage EX5 319, execution unit pipeline stage EX6 321 and execution unit pipeline stage EX7 323. Each sequential time divided processing of an instruction may be referred to as a pipestage. A pipestage may be, for example, issue pipestage IS2 303. Supporting circuits for the pipestage are located at the same stage, also known as the current stage. A supporting circuit includes, for example, tracking register 353. Circuits at a later stage include, for example, issue pipestage IS3 305. These circuits in the later stage are said to be below the current stage. Circuits at an earlier stage, such as, issue unit IS1 301, are said to be above the current stage. The circuit immediately above the current stage is called the prior stage.

Dispatched instructions arrive at issue unit IS1 301 at regular intervals. In order to make room for a new instruction arriving to issue unit IS1 301, each stage below, perhaps starting with execution unit EX7 323, may propagate to the successive stage. One exception is that occasionally a stall signal will cause some instructions to stall for several processor cycles in the issue units, such as, issue unit IS1 301, issue unit IS2 303, and issue unit IS3 305. Propagating includes both advancing bits and instructions to a subsequent stage, as well as stalling bits and instructions within a stage. As such, a propagate circuit may include, for example, logic 367. A propagate circuit may include, for example, stall circuit 324 and stall circuit 327. A pipestage stall circuit may govern whether a stage releases an instruction to a subsequent stage. A propagate circuit may mark a flush latch on the basis of a flush latch in the current or predecessor stage, among other things.

Tracking registers 351-365 respectively correspond to the stages that include the issue unit pipeline stage IS1 301 through the execution unit pipeline stage EX3 315. Generally, each tracking register advances and stalls in a similar manner as the corresponding pipelined instruction stage. In general, bits propagate through several stages from IS1 to EX3. At each stage, fewer bits are needed. A bit is associated with each of the successive stages where a supporting instruction may be located. The earliest stage, IS1, has the largest register because the IS1 stage could depend on an instruction, specifically a load, located in unit pipeline stage IS2 303 through unit pipeline stage EX7 323. The instruction in unit pipeline stage EX3 315 stage may depend on unit pipeline stage EX7 323 alone, thus tracking register 365 for EX3 315 may be one bit. The sizing of each stage's tracking register will be further explained in relation to FIGS. 4A, 5A, and 6A.

The pipeline processor may instruction fetch instructions and place such instructions into issue stage IS1 301. Generally, the pipeline advances an instruction one stage per clock cycle. Eventually many of the pipeline stages may hold and process instructions. Instructions may be fetched from memory. The memory may be, for example, memory 104 of FIG. 1. An instruction may be a load instruction, that is, an instruction that loads a general purpose register with data held in a memory. The pipeline processor may detect a cache-miss and temporarily store the load instruction in miss queue 383. Miss queue 383 may be a first in any time out type of queue. Random access of the miss queue 383 is needed because some load misses are caused by a L2 cache miss, and some are caused by a L3 cache miss, wherein each cache type has a different latency to recover from a miss. Load instructions that have had a load miss may be stored within miss queue 383. Detect load miss circuit 381 may be coupled to a cache controller to detect when an expected load from the cache fails to appear for the EX7 instruction, that is, to detect a load miss. Detect load miss circuit 381 may be a part of the cache controller.

Operand dependency checking circuit 310 may examine issue unit IS1 301 to see which, if any, registers are operands of the instruction held therein. A load/store unit may process a load instruction. Since a cache unit that retries the data may take a few cycles to return a load-hit, the load instruction will propagate several stages through the pipeline before the status of the load instruction is known. The registers may be the subject of a load instruction in a later stage, and thus, the instruction in IS1 unit pipeline stage 301 may be dependent upon such load instruction or instructions. Consequently, operand dependency checking circuit 310 examines all units from issue unit IS1 301 through execution unit EX7 pipeline stage 323 as well as the load instructions, if any, that occupy the load miss queue 383. The contents of each stage subsequent to the IS1 stage contributes to associated bits, generally known as bits IS2, IS3, RF1, RF2, EX1, EX2, EX3, EX4, EX5, EX6, and EX7 in register 351. Where operand dependency checking circuit 310 finds a dependency, the circuit marks the associated bit or dependent bit with a '1'. Sometimes, an upstream instruction accesses the register that a load instruction refers to, for example, "add rx, r2" may depend on an instruction that previously loaded register r2, that is, "load r2". In this case, the "add rx, r2" instruction is dependent upon the "load r2" instruction. Instructions such as "add rx, r2" are said to require register accesses.

Operand dependency checking circuit 310 sets the IS1's flush latch 331 provided the IS1 instruction hits on miss queue 383, that is, the IS1 instruction depends upon a recent load instruction that suffered a missed load upon departing the EX7 execution unit pipeline stage, and further provided that the IS1 instruction accesses the register that would have received data had the recent load instruction been a cache hit. The dependent bit is sometimes called a dependency. While a dependent bit and one or more bits in a common register, whether marked 1 or 0, are called dependencies.

Stall circuit 327 controls propagation of the dependencies, for example, the dependencies stored in tracking register 351 may propagate under the control of stall circuit 327. In this context, propagating means that the bits of a register are mapped to bits of a subsequent register, in this case register 353 are mapped to bits of the current register, in this case register 351.

Absent a stall, the bits of register 351 are rotated right one space and placed in register 353, wherein the least significant bit of register 351 contributes to logic 367. Stall circuit 324 places the result from logic 367 into subsequent flush latch 333. It is appreciated that a rotate may equally well be described as rotating left, and that the term right is used merely as a convenience, and not intended to limit the invention. Rotating means that bits are transferred or mapped such that bits that are logically adjacent in one stage are moved to positions that are logically adjacent in a second stage. Moreover, a mere subset of bits may remain adjacent in another or subsequent stage.

The presence of a stall, on the other hand, causes stall circuit 327 to rotate bits associated with unstalled stages one bit to the right, and returns the bits to register 351, filling in any vacancies with '0's. Stall circuit 324 allows logic 367 to place a result into flush latch 331. Logic 367 as well as functionally equivalent circuits 368-374 assures that a flush bit is durable through to flush latch 347. That is, once a flush bit is set in a stage, each subsequent stage will carry the marked bit so that the instruction in the corresponding pipestage continues to have an associated flush bit marked until EX5 stage 319, which is the flush stage.

Within a stage, the flush latch is strongly associated with the tracking register. A set flush latch means the instruction of that stage is dependent on either an instruction that is currently experiencing a detectable load miss, or is dependent on an instruction that had experienced a detectable load miss. Consequently, together, a tracking register and the flush latch of the same stage are called a tracking storage for the stage.

The circuits of FIG. 3 permit three consecutive cycles of stalling of instructions located in issue unit IS1 301 through issue unit IS3 305. A stall circuit corresponds to each register and to each flush bit of each issue stage. It is appreciated that there may be fewer or more consecutive cycles of stalling to correspond with fewer or more issue stages, and that the invention is not limited to a design having three cycle stalls. Similarly, there may be fewer or more issue unit pipeline stages than IS1 301, IS2 303 and IS3 305.

During a stall, issue unit IS1 301, issue unit IS2 303, and issue unit IS3 305 hold instructions contained therein in place, while register fetch RF1 unit 307 is filled with an invalid instruction. Similarly, the corresponding register 357 and flush latch 337 are filled with zeros.

Issue unit IS2 303 thus has stall circuit 328 that governs the propagation from register 353 to the subsequent register 355, and stall circuit 325 that governs the propagation of a flush bit in flush latch 333 to flush latch 335. Circuits 328 and 325 may be slaved to circuits 327 and 324 respectively so that a stall is coordinated to occur at both stages IS1 and IS2.

Issue unit IS3 305 thus has stall circuit 329 that governs the propagation from register 355 to subsequent register 357, and stall circuit 326 that governs the propagation of a flush bit in flush latch 335 to flush latch 337. Circuits 329 and 326 may be slaved to circuits 327 and 324 respectively so that a stall is coordinated to occur at both stages IS1 and IS3. When a stall is not occurring, register 355 maps to register 357 such that three bits are discarded. The bits discarded are the RF1, RF2 and EX1 stage bits of register 355.

A clock signal may be timed to cause a register in a lower position to receive a mapping of bits from a current position in order to preserve data of the current position prior to a mapping from a prior position. Thus the timing may preserve data of the current position while propagation occurs.

Propagation of stages RF1 and below is relatively straightforward. Register 359 receives the bits of register 357 rotated one to the right, with the EX7 bit of register 357 contributing to logic 370 and thus to RF2 associated flush latch 339.

Secondly, register 361 receives the bits of register 359 rotated one to the right, with the EX7 bit of register 359 contributing to logic 371 and thus to EX1 associated flush latch 341.

Thirdly, register 363 receives the bits of register 361 rotated one to the right, with the EX7 bit of register 361 contributing to logic 372 and thus to EX2 associated flush latch 343.

Fourthly, register 365 receives the bits of register 363 rotated one to the right, with the EX7 bit of register 363 contributing to logic 373 and thus to EX3 associated flush latch 345.

No further rotates occur below the EX3 stage. Register 365 may be a latch holding an EX7 bit associated with stage EX3. The EX7 bit contributes to logic 374 and thus to EX4 associated flush latch 347.

Propagation from EX4 flush latch 347 is direct to EX5 flush latch 349, which carries an execution stage flush bit. Detect flush circuit 350 may determine if the instruction of execution unit EX5 319 is to propagate to execution unit EX6 321. The presence of a set bit in EX5 flush latch 349 at the beginning of a cycle causes the instruction in execution pipeline unit stage EX5 319 to flush. Detect flush circuit 350 flushes the instruction of execution unit EX5 319 under this condition. Otherwise, the EX5 stage propagates to the EX6 stage. In other words, detect flush 350 circuit may determine that a flush occurs by detecting the presence of a set bit in EX5 flush latch 349.

Other embodiments may establish additional execution stages beyond EX7, for example, EX8. No bits are allocated for such stages in the tracking registers since stages EX8 and beyond are beyond the load miss detection point, which, in the present example, is EX7 stage.

FIGS. 4A, 4B, 5A, 5B, 6A, and 6C show how the embodiment of FIG. 3 might execute the following code comprising one instruction per line:
load r1
load r2
load r3
load r4, r2
add rx, r2
add ry, r3
vmx
add rz, r1, r3

FIGS. 4A, 5A, and 6A show the contents of each functional unit of the pipestage and the corresponding tracking registers.

FIG. 4A shows the progress of instructions through the pipestages at an arbitrary time, for example, t=0, wherein each integer of time denotes a clock cycle of the microprocessor. Each pipestage name appears in pipestage column 410. The instruction, if any, stored in the pipestage appears in instruction column 420. The contents of the tracking registers appear in register columns 430.

FIG. 4B shows miss queue 450 of the instructions that have left or been diverted from the execution pipeline unit stage EX7 323 stage when a load miss occurred. When an instruction enters miss queue 450 the instruction is said to be diverted, since the instruction may not enter further pipestages until the missed load is resolved. The miss queue is a random access queue, with load misses occupying the first available position, and removed when the load data returns.

The queue may merely contain the register address as shown in column 470 and control information such as a valid bit. Column 480 is included to assist in describing the invention and is not typically implemented in hardware. An operand dependency checking circuit may examine the contents of each stage issue unit IS2 303 through execution pipeline unit stage EX7 323 and populate IS1 tracking register 451 and an associated flush latch. The IS2 instruction is "add rz, r1, r3" and depends on any loads of the r1 and r3 registers. The operand dependency checking may detect "load r3" instruction 417 at execution pipeline unit stage EX4 317, and a freshly missed load, "load r1" 483. The operand dependency checking may mark the EX4 bit of IS1 tracking register 451 and the associated flush, or "FL" bit to record a dependency from the IS1 instruction to the "load r3" 417 and "load r1" 483 instructions. The operand dependency checking circuits sets all remaining bits of tracking register 451 to '0' to show a lack of dependency on the referenced pipestage. Note that any cells shown in the tabulated FIG. 4A that are empty under the register or flush columns are not required; that is, the register or other storage need not provide space for storing beyond where the '0's and '1's are noted. The operand dependency checking circuit may be, for example, operand dependency circuit 310 of FIG. 3.

Previously marked dependency bit 491 exists at the IS3 stage wherein the stage depends on "load r3" instruction 417 held in execution pipeline unit stage EX4 317. Second previously marked dependency bit 493 exists at the RF1 stage wherein the stage depends on "load r2" 421 instruction held in execution pipeline unit stage EX6.

FIG. 5A shows the progress of instructions through the pipestages at an arbitrary time, for example, t=2. No instruction enters IS1 301, so operand dependency checking circuit may mark all bits in tracking register 551 to '0'. A stall occurred at t=1 when instruction "vmx" 523 reached IS3 305; consequently, issue unit IS2 303 and issue unit IS3 305 have been re-circulated by a stall circuit for one cycle. During a first clock cycle the marked bit 531 advances forward one tracking register while rotating right. During a second clock cycle the marked bit 531 rotates right during a stall in the IS2 tracking register. Flush bit 525, likewise, advances forward a stage, and is held by a stall circuit within the IS2 associated flush latch.

The "load r2" instruction passed out of the execution pipeline unit stage EX7 323 stage with a load hit, and so the "load r2" instruction does not get stored in miss queue 550. Consequently, the absence of a load miss signal causes a logic to receive bit 493 of FIG. 4A, and convert the bit to a '0' when the value of flush bit 541 for stage EX1 is determined.

FIG. 5B shows the instructions that have left the execution pipeline unit stage EX7 323 stage when a load miss occurred at a time concurrent with that shown in FIG. 5A.

FIG. 6A shows the progress of instructions through the pipestages at an arbitrary time, for example, t=4. FIG. 6B shows the instructions that have left the EX7 323 stage when a load miss occurred at a time concurrent with that shown in FIG. 6A. "Load r3" instruction 683 instruction in execution pipeline unit stage EX5 319 is a fresh load miss, having just left the EX7 323 stage. The instruction "add rz, r1, r3" continued stalling for the remaining two out of three cycles. A stall circuit rotates the bit 531 of FIG. 5A further, from EX6 to EX7 position of the IS2 during a second cycle. A clock signal causes the bit to enter a logic during a third cycle (t=4). Because of the load miss signal, the logic stored the bit 631 as a logic '1' in a flush latch for stage IS2. Similarly, the "add ry, r3" instruction at EX2 313 stage has an EX7 dependency bit from prior stage EX1 register. A clock signal rotates the EX7 dependency bit into logic while being activated by the load miss signal. The applicable logic circuit, based on a '1' input, stores a '1' bit 643 into the stage's flush latch. Consequently, three cycles after the depicted state of FIG. 6A, the "add rx, r2" advances to execution pipeline unit stage EX5 319, with an accompanying flush bit. At that time, a detect flush circuit reads the flush bit, and performs a flush operation on the instruction in execution pipeline unit stage EX5 319.

Figure 7A:
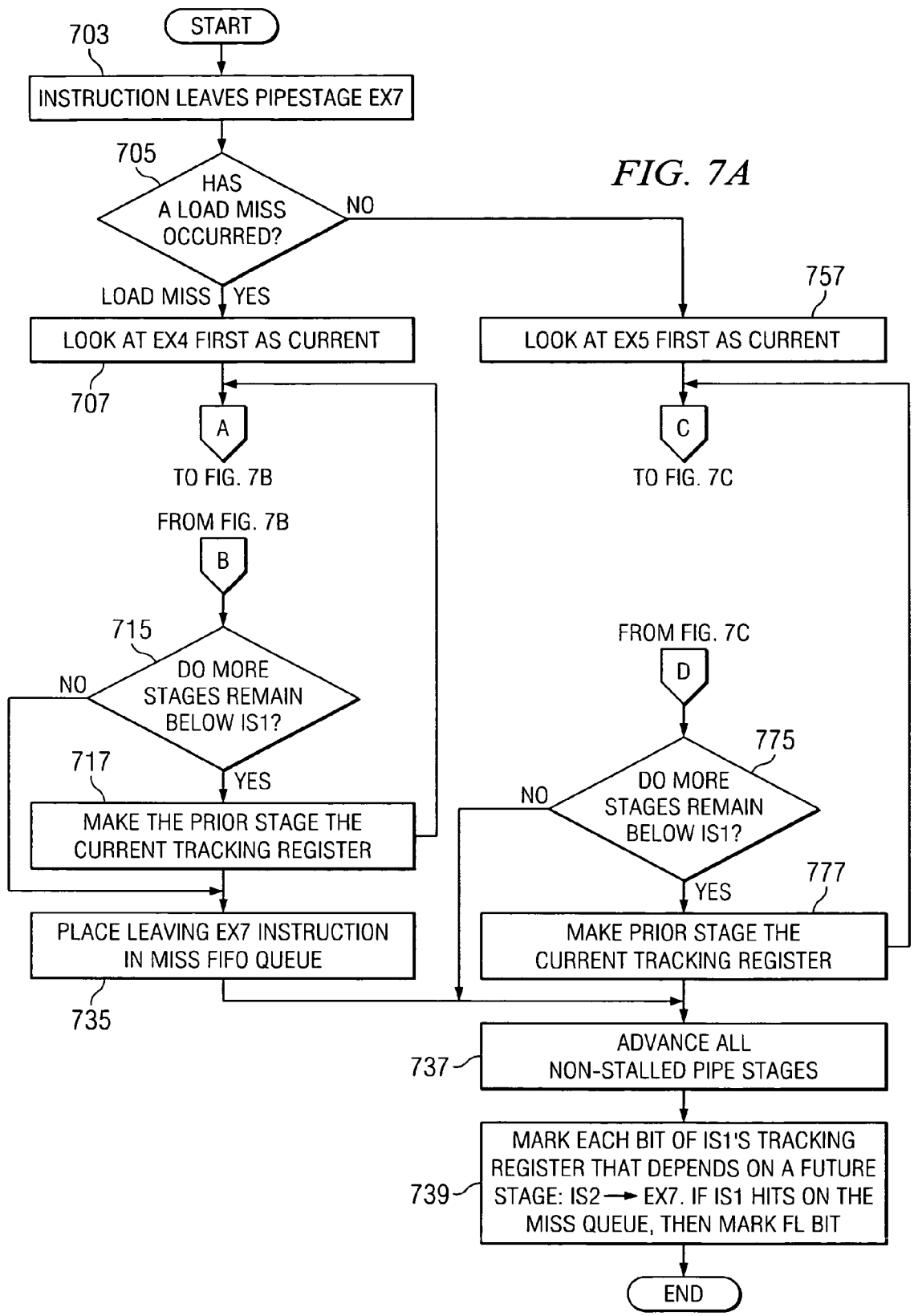
FIG. 7A is a flow chart of steps in accordance with an illustrative embodiment of the present invention.

FIG. 7A shows a portion of a flowchart of steps that may be executed to advance each pipestage and any associated tracking register once each processor clock cycle. Initially, a load instruction leaves the execution pipestage EX7 (step 703). The execution pipestage EX7 may be, for example, execution pipestage EX7 323 of FIG. 3. A determination is made concerning whether a load miss has occurred with respect to the load instruction (step 705). The occurrence of a "yes" result means that a load miss has been detected responsive to a determination that a load miss has occurred, the EX4 stage may be established as the current stage or current tracking register (step 707).

FIG. 7B shows that a test occurs to see if the current stage is stalled (step 709). If not, a determination may be made to see if a prior stage is stalled (step 711). The stage prior to EX4 is the EX3 stage. Since the EX3 stage does not stall, it is determined that the prior stage is not stalled in this example.

Consequently, a logic sets the current flush bit to the result of the EX7 bit of a prior tracking register logically ANDed with the load miss determination, and the outcome ORed with the prior stage flush bit (step 721), as further shown in FIG. 2A. Next, all bits but the EX7 bit of a prior tracking register, if any, are mapped or rotated, and then stored to the current tracking register while filling the leftmost bit with '0' (step 723).

Processing continues in FIG. 7A, wherein a test is made to see if more stages remain below IS1 (step 715). A "yes" determination results in making the prior stage the current tracking register or stage (step 717). At this point, the current stage becomes EX3.

A second iteration of steps 709, 711, 721, 723, and 715 occurs causing the prior stage to become the current tracking register or stage (step 717). At this point, the current stage becomes EX2.

A third iteration of steps 709, 711, 721, 723, and 715 occurs causing the prior stage to become the current tracking register or stage (step 717). At this point, the current stage becomes EX1.

A fourth iteration of steps 709, 711, 721, 723, and 715 occurs causing the prior stage to become the current tracking register or stage (step 717). At this point, the current stage becomes RF2.

A fifth iteration of steps 709, 711, 721, 723, and 715 occurs causing the prior stage to become the current tracking register or stage (step 717). At this point, the current stage becomes RF1.

Using the examples of FIG. 4A, one cycle following the state shown, T=1, the IS3 stage was stalled. If the current stage is RF1, then the current stage may not be stalled. However, IS3 is the prior stage, and IS3 may be stalled. Execution may continue to a determination whether the current stage is stalled (step 709). If the determination is "no", and respondent to that, a determination is made whether the prior stage stalled (step 711). If the determination is "yes", which causes execution to continue by filling all bits with '0' (step 713). Execution continues to step 715 determining if more stages remain below IS1, which is "yes". Prior stage becomes current stage, that is, IS3 (step 717).

A determination is made as to whether the current stage, in this case IS3, is stalled (step 709). The determination is "yes". A logic sets the FL bit of the current stage to the result of the FL bit logically ORed with the EX7 bit of the current stage logically ANDed with the load miss determination (step 731) in the manner shown in FIG. 2A. During a first cycle of a stall in IS3, a stall circuit rotates all bits left of the EX7 bit, filling the leftmost bit with '0' (step 733). Rather than advance the bits stored in the tracking register, a stall circuit may keep bits in the same tracking register when rotating. A further test of whether more stages remain below IS1 (step 715). In this case, more stages do remain below IS1.

A determination whether the current stage, in this case IS2, is stalled (step 709). If the determination is "yes", the FL bit of the current stage is set to the result of the FL bit logically ORed with the EX7 bit of the current stage logically ANDed with load miss determination (step 731) in the manner shown in FIG. 2A. During a first cycle of a stall in IS2, all bits above the EX7 bit may be rotated right, filling the leftmost bit with '0' (step 733). Rather than advance the bits stored in the tracking register, a stall circuit may keep bits in the same tracking register when rotating. A further test of whether more stages remain below IS1 (step 715), wherein, in this case, there are not.

If the instruction is a load miss, processing continues by placing the instruction that is leaving the EX7 stage into the miss queue (step 735). Then a clock signal advances all non-stalled pipe stages (step 737), which may include loading IS1 with an instruction.

An operand dependency checking circuit may examine all stages beyond IS1 to see which stage loads a register upon which IS1 depends. Provided that a stage loads such a register, operand dependency checking circuit may mark a bit, reflecting which stage loads such a register by placing a mark in the associated bit of the IS1 tracking register (step 739). If a freshly missed load is in the miss queue, that is, IS1 hits on the miss queue, then the operand dependency checking circuit marks the FL bit for the IS1 stage.

An alternate path may occur in the event that valid data for a load instruction leaves EX7 or a load miss is absent at this cycle responsive to a determination that a load miss has not occurred, the EX5 stage may be established as the current stage or current tracking register (step 757).

FIG. 7C shows that a test occurs to see if the current stage is stalled (step 759). If not, a determination may be made to see if a prior stage is stalled (step 761). The stage prior to EX5 is the EX4 stage. Since the EX4 stage does not stall, it is determined that the prior stage is not stalled.

Consequently, the current flush bit is set to the prior stage flush bit (step 771). Next, all bits but the EX7 bit of a prior tracking register, if any, are mapped/rotated, and then stored to the current tracking register (step 773).

Processing continues in FIG. 7A, wherein a test is made to see if more stages remain below IS1 (step 775). A "yes" determination results in making the prior stage the current tracking register or stage (step 777). At this point, the current stage becomes EX4.

A second iteration of steps 759, 761, 771, 773, and 775 occurs causing the prior stage to become the current tracking register or stage (step 777). At this point, the current stage becomes EX3.

A third iteration of steps 759, 761, 771, 773, and 775 occurs causing the prior stage to become the current tracking register or stage (step 777). At this point, the current stage becomes EX2.

A fourth iteration of steps 759, 761, 771, 773, and 775 occurs causing the prior stage to become the current tracking register or stage (step 777). At this point, the current stage becomes EX1.

A fifth iteration of steps 759, 761, 771, 773, and 775 occurs causing the prior stage to become the current tracking register or stage (step 777). At this point, the current stage becomes RF2.

A sixth iteration of steps 759, 761, 771, 773, and 775 occurs causing the prior stage to become the current tracking register or stage (step 777). At this point, the current stage becomes RF1.

Assuming an example similar to that of FIG. 4A, one cycle following the FIG. 4A time depiction, T=1, a stall circuit stalls the IS3 stage. The chief difference here is that in this example, unlike that of FIG. 4A, there is no load miss. If the current stage is RF1, then the current stage may not be stalled. However, IS3 is the prior stage, and IS3 may be stalled. Execution may continue to a determination whether the current stage is stalled (step 759). If the determination is "no", a determination is made whether the prior stage stalled (step 761). On the other hand if the determination is "yes", execution continues by filling all bits with '0' (step 763). Execution continues to step 775 determining if more stages remain below IS1, which is "yes". Prior stage becomes current stage, that is, IS3 (step 777).

A determination is made whether the current stage, in this case IS3, is stalled (step 759). The determination is "yes". The FL bit of the current stage is set to the result of the FL bit remains unchanged (step 781). During a first cycle of a stall in IS3, a stall circuit rotates all bits left of the EX7 bit, filling the leftmost bit with '0' (step 783). Rather than advance the bits stored in the tracking register, a stall circuit may keep bits in the same tracking register when rotating. A further test of whether more stages remain below IS1 (step 775), wherein, in this case, there are.

Eventually, there are no more stages below IS1 to treat as current, and iterations through step 775 may stop. A clock signal advances all non-stalled pipe stages (step 737).

Operand dependency checking circuit may examine all stages other than IS1 to see which stage loads a register upon which IS1 depends, and provided a stage loads such a register, operand dependency checking circuit may mark a bit, reflecting which stage loads such a register by placing a mark in the associated bit of the IS1 tracking register (step 739). As such, the bit is associated with the issue stage, for example IS1, and the subsequent stage, the stage that loads the register. If a freshly missed load is in the miss queue, that is, IS1 hits on the miss queue, then the operand dependency checking circuit marks the FL bit for the IS1 stage. The FL bit of the IS1 stage may be associated with an EX8 stage and the IS1 stage.

Thus, an illustrative embodiment of the present invention may permit an instruction to progress far into the functional units of a pipeline processor, such that data is processed while tracking the dependent instructions in a table or series of registers.

The invention can take the form of an entirely hardware embodiment, an entirely software embodiment or an embodiment containing both hardware and software elements. Moreover, a reverse logic may be implemented which flushes an instruction at an execution stage on the basis of a '0' being stored in an associated same stage flush latch, wherein initially, an operand dependency checking circuit may populate an issue stage tracking storage with logical '1' bits where there exists no dependency between the issue stage instruction and the referenced stage. In such an embodiment, an equivalent reverse logic may be used to mark bits, wherein setting a latch or tracking register bit to '0' is a marking. By the same token, some embodiments may implement rotations to the left and the bit that may feed into a logic may be a most significant bit.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor implemented method for flushing a register access instruction from a pipeline functional unit having a plurality of stages, wherein each stage in the plurality of stages has an associated dependency tracking register in a plurality of dependency tracking registers, coupled to circuit logic of the stage, the method comprising:

detecting a register access instruction in an issue stage targeting a register;

detecting a load of the register in a subsequent stage, the load being issued to the pipeline functional unit prior to issuing the register access instruction;

in response to detecting the register access instruction in the issue stage and detecting the load of the register in the subsequent stage, marking a bit as a marked bit in a first dependency tracking register associated with the issue stage, wherein each dependency tracking register in the plurality of dependency tracking registers has a separate bit associated with each stage in the plurality of stages of the pipeline functional unit, and wherein the marked bit is a bit, in the first dependency tracking register, corresponding to the subsequent stage thereby identifying the register access instruction as being dependent upon the load, wherein the marked bit is associated with the issue stage and the subsequent stage;

propagating the register access instruction from the issue stage to a third stage;

propagating the marked bit from the first dependency tracking register to a second dependency tracking register, in the plurality of dependency tracking registers, associated with the third stage;

responsive to propagating the register access instruction to the third stage, propagating the register access instruction to a flush stage;

responsive to propagating the marked bit to the third stage, propagating the marked bit to the flush stage; and responsive to propagating the register access instruction to the flush stage and responsive to propagating the marked bit to the flush stage, flushing the register access instruction from the pipeline functional unit so that the register access instruction is not propagated to a next stage prior to reaching a final stage.

2. The method of claim 1, wherein propagating the marked bit to the third stage comprises:

determining whether a stall occurred in a stall circuit; and in response to determining that a stall has occurred, setting the third stage as the issue stage, and wherein the method further comprises, if the stall has occurred, copying a prior stage flush latch bit to a flush latch of the issue stage.

3. The method of claim 1, wherein propagating the marked bit to the third stage comprises:

determining whether a stall occurred at a stall circuit;

if the stall has occurred, placing a logic result of a load-miss signal and a least significant bit of a dependency tracking register in a flush latch of the issue stage, and if the stall has occurred, moving bits more significant to a least significant bit of a dependency tracking register a step right wherein the dependency tracking register is associated with the issue stage.

4. The method of claim 3, wherein placing the logic result further comprises:

logical ANDing the load-miss signal and the least significant bit of the dependency tracking register to form an intermediate result; and logical ORing a stage flush latch and the intermediate result to form the logic result.

5. A system for flushing instructions dependent upon a missed load instruction in a pipeline architecture having a plurality of stages comprising an issue stage and an execution stage for processing instructions, wherein each stage in the plurality of stages has an associated dependency tracking register in a plurality of dependency tracking registers, coupled to circuit logic of the stage, the system comprising:

an operand dependency checking circuit for detecting a dependency between an issue stage register access instruction with an instruction in a subsequent stage and marking a bit as a marked bit in a first dependency tracking register associated with the issue stage, wherein each dependency tracking register in the plurality of dependency tracking registers has a separate bit associated with each stage in the plurality of stages of a pipeline functional unit, and wherein the marked bit is a bit, in the first dependency tracking register, corresponding to the subsequent stage thereby identifying the register access instruction as being dependent upon the instruction in the subsequent stage, and wherein the marked bit is associated with the subsequent stage in a dependency tracking register;

a detect load miss circuit for detecting a cache miss of an instruction loading a register and outputting a load miss signal upon occurrence of a cache miss;

at least one propagate circuit for marking at least one flush latch in response to the load miss signal; and a flush circuit for flushing an execution stage instruction from the pipeline functional unit so that the execution stage instruction is not propagated to a next stage prior to reaching a final stage based on an execution stage flush bit, wherein the marked bit is propagated from one dependency tracking register to another dependency tracking register in the plurality of dependency tracking registers as the issue stage register access instruction is propagated through the pipeline architecture.

6. The system of claim 5 wherein the at least one propagate circuit is a logical AND of the load miss signal with a least significant bit of a dependency tracking register providing a first input to a logical OR having a second input from a flush latch providing an output bit to a subsequent stage.

7. The system of claim 5 wherein the operand dependency checking circuit detects a dependency when an issue stage contains a register access instruction for accessing a target register and a miss queue contains an instruction to load the target register.

8. The system of claim 5 wherein the operand dependency checking circuit detects a dependency when an issue stage contains a register access instruction for accessing a target register and a subsequent stage contains a register access instruction for accessing the target register.

9. The system of claim 8 wherein the at least one propagate circuit is a logical AND of the load miss signal with a least significant bit of a dependency tracking register providing a first input to a logical OR having a second input from a flush latch providing a bit to a subsequent flush latch.

10. The system of claim 5, wherein each stage in the plurality of stages comprises:

a propagation logic circuit;

a dependency tracking register, from the plurality of dependency tracking registers, coupled to the propagation logic circuit; and a flush latch coupled to the propagation logic circuit, wherein the propagation logic circuit receives as input a load miss signal, from a detect load miss circuit, indicative of whether a load instruction resulted in a cache miss, an output of a least significant bit of the dependency tracking register of the stage, and a flush latch bit, and wherein the propagation logic circuit outputs a result value to a flush latch of a next stage in the plurality of stages.

11. The system of claim 10, wherein the propagation logic circuit of each stage comprises an AND gate coupled to an OR gate, and wherein:

the AND gate receives both the load miss signal and the least significant bit of the dependency tracking register of the stage as inputs and generates an output that is input to the OR gate, and the OR gate receives both the output from the AND gate and a flush latch bit from the flush latch of the stage, and outputs a result to a flush latch of the next stage.

12. The system of claim 5, wherein a subset of stages in the plurality of stages further comprises:

a first stall circuit coupled to the dependency tracking register and a dependency tracking register of the next stage in the plurality of stages; and a second stall circuit coupled to the propagate circuit, a flush latch of the stage, and a flush latch of the next stage in the plurality of stages, and wherein the first stall circuit governs propagation of contents of the dependency tracking register of the stage to the dependency tracking register of the next stage, and the second stall circuit governs propagation of a flush latch bit in the flush latch of the stage to a flush latch of the next stage.

13. The system of claim 5, wherein, for each subsequent stage in the plurality of stages, an associated dependency tracking register has a smaller width than a dependency tracking register of a previous stage in the plurality of stages.

14. The system of claim 5, wherein:
- the operand dependency checking circuit is coupled to circuitry of each stage in the plurality of stages and a load miss queue,
- the operand dependency checking circuit receives an input from a functional unit of each stage, and
- the operand dependency checking circuit determines a dependency between the issue stage register access instruction with an instruction in a subsequent stage by comparing a register targeted by the issue stage register access instruction with operands of instructions held in each of the functional units of each of the stages in the plurality of stages.

15. The system of claim 14, wherein the operand dependency checking circuit further compares the register targeted by the issue stage register access instruction with operands of instructions held in the load miss queue and sets a flush bit of a flush latch of the issue stage in response to detecting a match between the register targeted by the issue stage register access instruction and an operand of an instruction held in the load miss queue.

16. A method for flushing instructions in a pipeline architecture having a plurality of stages comprising at least an issue stage and an execution stage for processing instructions, wherein each stage in the plurality of stages has an associated dependency tracking register in a plurality of dependency tracking registers, coupled to circuit logic of the stage, the method comprising:
- detecting a dependency of a register access instruction in the issue stage with an instruction in a subsequent stage and marking a bit as a marked bit in a first dependency tracking register associated with the issue stage, wherein each dependency tracking register in the plurality of dependency tracking registers has a separate bit associated with each stage in the plurality of stages of a pipeline functional unit, and wherein the marked bit is a bit, in the first dependency tracking register, corresponding to the subsequent stage thereby identifying the register access instruction as being dependent upon the instruction in the subsequent stage, and wherein the marked bit is associated with the subsequent stage in a dependency tracking register;
- storing a bit associated with the subsequent stage in a dependency tracking register;
- detecting a cache miss of an instruction loading a register;
- responsive to detecting the cache miss, outputting a load miss signal;
- marking at least one flush latch in response to the load miss signal from a detect load miss circuit; and
- flushing an instruction in an execution stage from the pipeline functional unit so that the instruction is not propagated to a next stage prior to reaching a final stage in response to an execution stage flush bit present in an execution stage flush latch, wherein the marked bit is propagated from one dependency tracking register to another dependency tracking register in the plurality of dependency tracking registers as the issue stage register access instruction is propagated through the pipeline architecture.

17. The method of claim 16 wherein the marking further comprises:
- logical ANDing of the load miss signal with a least significant bit of a dependency tracking register; and
- logical ORing a first input with a second input from a flush latch to provide an output bit to a subsequent stage.

18. The method of claim 16 wherein detecting a dependency comprises:
- detecting a dependency when an issue stage contains a register access instruction for accessing a target register and a miss queue contains an instruction to load the target register.

19. The method of claim 16 wherein detecting a dependency comprises:
- detecting a dependency when an issue stage contains a register access instruction for accessing a target register and a subsequent stage contains an instruction to load the target register.

20. The method of claim 19 wherein marking comprises:
- logical ANDing of the load miss signal with a least significant bit of a dependency tracking register providing a first input to a logical OR having a second input from a flush latch providing an output bit to a subsequent flush latch.

21. An information handling system comprising:
- a memory;
- a processor coupled to the memory, wherein the processor has a plurality of stages comprising at least one issue stage and an execution stage for processing instructions, wherein each stage in the plurality of stages has an associated dependency tracking register in a plurality of dependency tracking registers, coupled to circuit logic of the stage, the processor comprising:
- an operand dependency checking circuit for detecting a register access instruction, in the at least one issue stage, targeting a register and detecting a load of the register in a subsequent stage, and marking a bit as a marked bit in a first dependency tracking register associated with the issue stage, wherein each dependency tracking register in the plurality of dependency tracking registers has a separate bit associated with each stage in the plurality of stages of a pipeline functional unit, and wherein the marked bit is a bit, in the first dependency tracking register, corresponding to the subsequent stage thereby identifying the register access instruction as being dependent upon the load, and wherein the marked bit is associated with the subsequent stage in a dependency tracking register;
- a detect load miss circuit for detecting a cache miss of an instruction loading a register and outputting a load miss signal upon occurrence of a cache miss;
- at least one propagate circuit for marking at least one flush latch in response to the load miss signal; and
- a flush circuit for flushing an execution stage instruction from the pipeline functional unit so that the execution stage instruction is not propagated to a next stage prior to reaching a final stage based on an execution stage flush bit, wherein the marked bit is propagated from one dependency tracking register to another dependency tracking register in the plurality of dependency tracking registers as the issue stage register access instruction is propagated through the plurality of stages.

* * * * *